Figures 1, 2, 3, 4, 5:
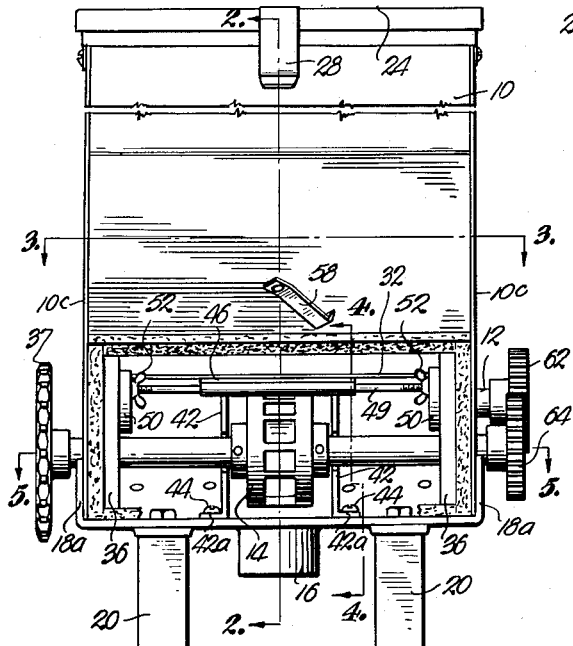

June 5, 1956 M. J. RUSSEL 2,748,989
FERTILIZER DISTRIBUTOR
Filed July 10, 1952

INVENTOR.
Matthew J. Russel
BY
ATTORNEY.

United States Patent Office 2,748,989
Patented June 5, 1956

2,748,989
FERTILIZER DISTRIBUTOR
Matthew J. Russel, Lincoln, Nebr.
Application July 10, 1952, Serial No. 298,031
5 Claims. (Cl. 222—238)

This invention relates to apparatus for distributing fertilizer or like substances, and more particularly to an improved power-driven distributor having discharge mechanism for delivering the fertilizer at an even rate including means for positively regulating the amount of fertilizer delivered to the discharge mechanism.

In general, fertilizer distributors previously known to the art are of the so-called gravity feed type, consisting basically of a storage hopper for the fertilizer having a discharge passage at the bottom through which the fertilizer flows under the influence of gravity. To regulate the gravity flow, many of these machines are provided with discharge mechanisms located either inside or outside the hopper, which are intended to deliver the fertilizer in predetermined increments at an even rate. These discharge mechanisms vary widely in construction and operation, but all depend for successful operation upon maintaining the fertilizer within the hopper in a broken-up and unpacked condition in order that the gravity flow will remain relatively unimpaired. In many cases, separate agitators are provided for this purpose, taking the form of rotary paddles or augers disposed within the hopper which are driven either separately or from the main drive for the discharge mechanism. The effectiveness of these agitators is controlled largely by the number and size of the paddles or auger blades and the tendency of the fertilizer to clump or pack in a relatively cohesive mass, and the power required to drive the agitator is likewise determined by these factors. In situations where both the blades are large and the fertilizer is moist, the power requirements become almost prohibitive.

It is an object of this invention to overcome the above difficulties by providing a distributor in which the fertilizer is fed to the discharge mechanism by positive force feeding rather than by gravity alone and in which the force feeding means operates secondarily to agitate the material in the hopper. In this connection, it is a further object to provide a force feeding means requiring little power for operation.

Another object of this invention is to provide a distributor in which discharge takes place at an even rate, and at a rate which may be varied as desired.

Still another object is to provide a distributor in which leakage of material past the discharge mechanism is reduced to a minimum, and in which clogging is eliminated.

Other and further objects, together with the features of novelty appurtenant thereto, will appear in the course of the following description.

In the accompanying drawing which forms a part of the specification and is to be read in conjunction therewith, and in which like reference numerals indicate like parts in the various views, Fig. 1 is a front elevation of my invention with the protective cover plate for the dispensing mechanism removed, Fig. 2 is a cross-sectional view taken along line 2—2 of Fig. 1 in the direction of the arrows with the cover plate in place, Fig. 3 is a cross-sectional view taken along the line 3—3 of Fig. 1 in the direction of the arrows, Fig. 4 is a sectional view taken along line 4—4 of Fig. 1 in the direction of the arrows, Fig. 5 is a sectional view taken along line 5—5 of Fig. 1 in the direction of the arrows.

Referring to the drawing, in which a preferred embodiment of my invention is shown, the basic elements include a hopper 10 (preferably formed of aluminum sheet), an auger shaft 12 mounted inside the lower portion of the hopper and extending transversely therethrough, and a circumferentially pocketed feed wheel 14 which, as will be explained in detail hereinafter, is adapted to receive material from within the hopper and deliver same to a discharge spout 16 located therebelow. The entire unit is mounted on a base member 18, preferably cast in the form shown from a suitable metal such as aluminum, the discharge spout 16 being located centrally therein. When mounted for operation upon a tractor, seed drill or other suitable vehicle, the unit assumes the upright position of Figs. 1 and 2, and is attached to the vehicle by means of mounting brackets 20 which are bolted to the bottom of the base member 18 by means of bolts 22. It will be understood, of course, that the other means for attachment may be used with equal facility.

Turning to a more detailed description of the elements broadly outlined above, the hopper 10 takes the form of a generally rectangular box-like receptacle whose front and rear walls converge as at 10a and 10b to provide a V-shaped trough at the bottom. The top of the hopper is fitted with a cover 24 hingedly connected to the hopper at one edge as at 26, and provided with a spring snap latch 28 at the other edge which releasably engages a catch 30 on the side of the hopper. As will be particularly noted from Fig. 2, the converging front and rear walls 10a and 10b do not meet, the front wall 10a terminating above the bottom of the trough, and the intervening space is filled by an arcuate plate 32 spanning the width of the hopper and forming in effect an extension of the forward wall 10a to complete the trough-like bottom. The plate 32 is carried on a similarly formed backing member 33 of relatively greater thickness which in turn is rigidly attached to the base member by screws 33a. (See Fig. 4). The hopper is secured to the base member 18 by means of upstanding flanges 18a at either end of the latter which overlie and are secured to the side walls 10c.

Positioned adjacent the arcuate plate 32 on the outside of the hopper is the rotatable feed wheel 14 which is carried by a shaft 34. The shaft 34 is journaled at each end in bearing blocks 36 which are supported on the base member 18, and has affixed to one end a sprocket 37 by which the feed wheel may be driven through a chain drive (not shown). As will be evident from Figs. 1, 2, and 5, the feed wheel 14 is in the form of cylindrical member provided with a plurality of circumferential pockets 14a around its periphery. The pockets are located centrally of the wheel and are adapted to register successively with an aperture 38 in the arcuate plate 32 which forms the front wall of the trough at the bottom of the hopper. As will be particularly noted from Fig. 2, the configuration of the pockets is such that in section they are substantially trapezoidal, the trailing walls 14b of each pocket being substantially radial to the shaft 34 and the leading wall 14c being inclined forwardly and non-radial. Such an arrangement facilitates picking up the material as it is discharged laterally through aperture 38 from the hopper, the trailing walls 14b being substantially horizontal as they pass the lower edge of the aperture. Similarly, the inclined forward walls 14c aid in the discharge of the material from the pockets and through the spout 16.

To reduce leakage losses past the feed wheel 14, the base member 18 is provided with a raised shoulder portion having a curved surface 18b which conforms with the curvature of the wheel and is as close to the periphery of the wheel as is possible without contact between the two. In this connection, it will be noted that the curved surface 18b terminates short of the spout opening 16 to leave a flat surface 40 directly under the wheel. In the event that some leakage does take place past the curved surface, the flat surface 40 will cause a build-up or piling of material which will aid in restricting further leakage.

Referring now to Fig. 5, the backing member 33 on which arcuate plate 32 is mounted is divided into two sections, one on each side of the feed wheel 14, and abutting the confronting edges of these sections are a pair of parallel generally C-shaped side plates 42 (see Fig. 4) having flanges 42a which are attached to the base member 18 by screws 44. These side plates extend past the spout opening 16, and serve to insure that material being delivered by the distributor wheel 14 will pass directly to the spout.

The size of the aperture 38 is controlled by means of a slidable gate 46 positioned between plate 32 and the rim of the distributor wheel 14. The gate is preferably formed of sheet metal curved to conform with the curvature of plate 32, and its opposite edges are slidably received in guide slots 48 best seen in Fig. 5. That end of gate 46 positioned above the distributor wheel has affixed thereto a gate rod 49 whose ends are slidably received in arcuately slotted guides 50 attached to the bearing blocks 36. Each end of rod 49 is threaded, and mounted thereon are wing nuts 52 which may be tightened outwardly against guides 50 to secure the gate in any desired position.

The distributor wheel 14 and its associated parts are covered and protected by means of an inclined cover 54 which is hinged as at 56 to base member 18 and may be raised and lowered by means of handle 54a. The cover is latched by a pivotal L-shaped latch 58 which is shown in the open position in Fig. 1, and in the closed position in Fig. 2.

Located within the V-shaped trough at the bottom of the hopper 10 is the auger shaft 12 which serves as the means for forcing material from the hopper through aperture 38 to the pockets 14a of the distributor wheel. As best seen in Fig. 3, shaft 12 is journaled on opposite sides of the hopper in bearing blocks 60 secured to the inside of the hopper. One end of the shaft projects beyond the side of the hopper and has affixed thereto a gear 62 which meshes with and is driven by a gear 64 attached to the distributor wheel shaft 34 on the opposite end from sprocket 37. The auger shaft 12 is provided with oppositely spiraled threads 12a extending inwardly from its ends and joined at its center opposite aperture 38 in a U-shaped bight 12b. The arrangement of the threads is such that as the distributor wheel 14 and auger shaft 12 are rotated in the directions shown by the arrows, material will be forced inwardly from the sides of the hopper toward the center.

In this connection, it will be noted that the size and location of the auger shaft 12 and threads 12a, and the slope of the adjacent walls 32 and 10b of the trough, are so related as to provide relatively narrow passageways on each side of the shaft 12 which open into the relatively larger trough bottom. The shaft is also located above the center line of the aperture 38 (and the axis of the feed wheel shaft 34). For optimum results, the precise location of the auger shaft 12 should be such that its axis is within a horizontal plane through the upper edge of the aperture 38 when open to its maximum extent.

The location of the aperture 38 with respect to the axis of shaft 34 (on which the feed wheel 14 is mounted) also plays an important part in gaining optimum operational efficiency. For best results, the upper edge of the aperture 38 when open to its maximum extent should be at approximately forty-five degrees above a horizontal radius through the axis of shaft 34. Actual experiments have shown that if constructed according to the above description, the operational efficiency obtained reaches its highest possible value.

The operation of the machine is believed evident from the foregoing description. The hopper 10 is filled with the particular material desired to be distributed, for example, fertilizer, and a chain drive connected with the sprocket 36 on shaft 34 in a manner to rotate the distributor wheel 14 in the direction indicated by the arrow in Fig. 2. As the shaft 34 is rotated, the auger shaft 12 within the hopper is driven in the opposite direction through gears 62 and 64. The spiral or helical threads 12a on the auger shaft 12 draw the material inwardly toward the center of the trough at a faster volumetric rate than it can be displaced upwardly through the narrow passageways on each side of the auger shaft 12, thus creating a zone of compression in the area of aperture 38. By virtue of this compression, a radial thrust is exerted on the material and it is thereby forced outwardly through aperture 38 into the pockets 14a of the distributor wheel 14. The material is carried upwardly and over the top of the distributor wheel 14, and drops through the spout 16. The inclined leading faces 14c of the pockets 14a causes the material to be released before each pocket passes below the wheel and thereby creates an overlapping discharge from the pockets 14a so that there is continuous stream of material passing through spout 16. The rate of flow can of course be controlled by positioning the slidable gate 46 by means of the gate rod 48 and the adjustable wing nuts 52.

While as explained above, the auger threads 12a serve to force-feed the material through aperture 38, they have the added function of maintaining the material remaining within the hopper 10 in a constant state of agitation. As the material is drawn to the center of the hopper, part is forced laterally through the aperture 38; the remainder is thrust upwardly in the hopper and the center rises while the sides fall to take the place of material drawn inwardly by the auger. This action prevents "bridging" of the material within the hopper, and insures constant feed to the distributor wheel. The power required is considerably less than in apparatus using large paddles or auger blades for agitation, the arrangement of the auger 12 and the shape of the hopper 10 causing the material flow itself to do a major share of the work.

From the foregoing description it is believed evident that I have attained all the objects and advantages set out earlier. By locating the distributor wheel outside the hopper, the interference with rotation existing in previously known arrangements is wholly eliminated. The force-feeding obtained through the auger in conjunction with the V-shaped hopper insures of a positive discharge to the distributor wheel and also agitates the material within the hopper. The "overshoot" effect resulting from the direction of rotation of the distributor wheel prevents clogging of the material, and assures of efficient operation with a minimum of power.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a material distributing machine of the character described, a receptacle having a generally V-shaped bottom and adapted to be filled with material, one wall of said bottom having a centrally disposed discharge opening therein, a rotatable auger shaft within said receptacle aligned with and spaced slightly above the bottom thereof having on its exterior oppositely spiraled threads terminating at said discharge openings, means for rotating shaft in a direction whereby the threads tend to compress material inwardly from the ends of said receptacle and between the auger shaft and said bottom and force same laterally through said discharge opening, and means for taking material from said discharge opening at an even rate including a rotary distributor wheel positioned outside said receptacle and having a plurality of circumferentially spaced pockets around its periphery, the periphery of said wheel being positioned closely adjacent said discharge opening and the pockets being adapted to successively register with said discharge opening as said wheel is rotated.

2. A machine as in claim 1 wherein an adjustable gate is provided for regulating the size of said discharge opening.

3. In a distributing machine of the character described, a generally V-shaped trough adapted to be filled with material and having a centrally disposed discharge opening near the bottom of one wall, a rotary distributor wheel located outside said trough having its periphery in close adjacence to said one wall and provided with a plurality of circumferential pockets adapted to register successively with said discharge opening, means for rotating said distributor wheel so that said pockets travel upwardly past said discharge opening, a rotatable shaft within said trough aligned with and spaced slightly above the bottom thereof having on its exterior oppositely spiraled threads terminating at said discharge opening, said shaft being located above the center of said discharge opening and said threads being so arranged to draw material inwardly from the ends of said trough and at the same time compress it between said shaft and the bottom of the trough as it travels longitudinally of the shaft thereby to set up a zone of compression near the termination of said threads whereby material is forced laterally through said discharge opening into said pockets.

4. A machine as in claim 3 wherein an adjustable gate is provided for regulating the size of said discharge opening.

5. In a distributing machine of the character described, a hopper having converging front and rear walls to form a substantially V-shaped trough at the bottom thereof, one of said walls being curved to form a concave outer surface and said curved wall having a centrally disposed aperture near its lower edge, a rotatable distributor wheel located outside said hopper and mounted for rotation about an axis substantially parallel to the bottom of said hopper, said distributor wheel being positioned within said concave outer surface and having a plurality of circumferential pockets in its periphery adapted to register successively with said aperture, means for rotating said distributor wheel so that said pockets travel upwardly past said discharge opening, a rotatable shaft within said trough aligned with and spaced slightly above the bottom thereof having on its exterior oppositely spiraled threads terminating at a point adjacent said aperture, said threads being arranged to move material inwardly from opposite ends of said trough longitudinally of said shaft as said shaft is rotated whereby material is forced laterally through said aperture into the successive pockets of said distributor wheel.

References Cited in the file of this patent

UNITED STATES PATENTS

| | | |
|---|---|---|
| 617,821 | Street | Jan. 17, 1899 |
| 749,484 | Grier | Jan. 12, 1904 |
| 1,112,275 | Dueber | Sept. 29, 1914 |
| 1,489,739 | Chisholm | Apr. 8, 1924 |
| 1,813,519 | Varusky | July 7, 1931 |
| 1,840,505 | Gray | Jan. 12, 1932 |
| 1,912,172 | Bailey | May 30, 1933 |
| 1,947,379 | Cargill | Feb. 13, 1934 |
| 2,480,897 | Bettendorf | Sept. 6, 1949 |